United States Patent
Campisano

(10) Patent No.: US 6,227,447 B1
(45) Date of Patent: May 8, 2001

(54) CARDLESS PAYMENT SYSTEM

(75) Inventor: Kurt M. Campisano, Philadelphia, PA (US)

(73) Assignee: First USA Bank, NA, Wilmington, DE (US)

( * ) Notice: Subject to any disclaimer, the term of this patent is extended or adjusted under 35 U.S.C. 154(b) by 0 days.

(21) Appl. No.: 09/307,597

(22) Filed: May 10, 1999

(51) Int. Cl.[7] ..................................... G06K 5/00
(52) U.S. Cl. ............................. 235/380; 235/382
(58) Field of Search ..................... 235/380, 382, 235/382.5

(56) References Cited

U.S. PATENT DOCUMENTS

| | | |
|---|---|---|
| 3,896,266 | 7/1975 | Waterbury . |
| 3,938,091 | 2/1976 | Atalla et al. . |
| 4,582,985 * | 4/1986 | Lofberg ............................... 235/380 |
| 4,672,377 | 6/1987 | Murphy et al. . |
| 4,797,913 | 1/1989 | Kaplan et al. . |
| 5,023,904 | 6/1991 | Kaplan et al. . |
| 5,180,901 * | 1/1993 | Hiramatsu ........................... 235/380 |
| 5,181,238 | 1/1993 | Medamana et al. . |
| 5,336,870 | 8/1994 | Hughes et al. . |
| 5,450,479 | 9/1995 | Alesio et al. . |
| 5,465,290 | 11/1995 | Hampton et al. . |
| 5,479,494 | 12/1995 | Clitherow . |
| 5,513,250 | 4/1996 | McAllister . |
| 5,550,358 * | 8/1996 | Tait et al. ............................. 235/380 |
| 5,675,607 | 10/1997 | Alesio et al. . |
| 5,708,422 | 1/1998 | Blonder et al. . |
| 5,715,314 | 2/1998 | Payne et al. . |
| 5,715,399 | 2/1998 | Bezos . |
| 5,724,424 | 3/1998 | Gifford . |
| 5,770,843 | 6/1998 | Rose et al. . |
| 5,787,154 | 7/1998 | Hazra et al. . |
| 5,883,810 | 3/1999 | Franklin et al. ................ 364/479.02 |
| 6,000,832 | 12/1999 | Franklin et al. ................ 364/479.02 |
| 6,029,890 | 2/2000 | Austin ................................. 235/380 |
| 6,042,006 * | 3/2000 | Van Tilburg ...................... 235/382.5 |

OTHER PUBLICATIONS www.echarge.com web site;1999 eCharge Corporation, Seattle, WA (Info@eCharge.com); publication date unknown, web site last updated on Nov. 18, 1999.

International Search Report PCT/US00/12633 mailed Aug. 1, 2000.

* cited by examiner

Primary Examiner—Harold I. Pitts
(74) Attorney, Agent, or Firm—Hunton & Williams

(57) ABSTRACT

A Credit Card holder's telephone number is assigned to his or her credit card as an alias. The cardholder is then required to choose a PIN for security purposes. The telephone number is linked to the cardholder's credit card number via a database. When the cardmember enters into a transaction with a merchant, the card need not be present. The cardmember simply provides his or her telephone number and then the PIN. This can be done at any point of sale such as a store, catalog telephone order, or over the internet. The telephone number and PIN are entered and authorization is returned from the credit card company.

10 Claims, 6 Drawing Sheets

CARDLESS PAYMENT SYSTEM

FIELD OF THE INVENTION

This invention relates generally to a system and method for assigning an alias, such as a phone number and a Personal Identification Number ("PIN"), to a credit card so as to eliminate the need for the physical presence of the card during a transaction.

BACKGROUND OF THE INVENTION

There are literally thousands of different credit cards available. Some provide frequent flier miles, others give you free gas. Still other credit cards offer low interest rates and even insurance for your purchases. Out of all the credit cards that exist, none of them offer the ability to go to a store and make purchases without the actual card. While it is possible to place an order over the phone to a catalog company, it is still generally required to have the card in your hand to read the card number to the sales person and provide some additional information such as the expiration date. Perhaps a trivial number of people have memorized their credit card number and expiration date, but most people have yet to commit these seldom used 20-digits to memory.

Additionally, those with an active lifestyle will find it burdensome to carry many credit cards with them during their everyday lives. The risk of losing one's wallet or purse, or having it stolen is an ongoing problem. The replacement process for most credit cards is long and burdensome. If a credit card is stolen and unauthorized charges are discovered on the account, the process to rectify the situation is both time consuming and exhausting, often involving sworn affidavits by the cardmember.

These and other drawbacks of current credit cards exist.

SUMMARY OF THE INVENTION

An object of the present invention is to overcome the drawbacks of existing credit cards.

Another object of the present invention is to provide a system for assigning an alias for a cardholder's credit card number using an easy to remember number.

A further object of the present invention is a system and method for enabling a cardholder to use his or her credit card without actually having the card present at the time of purchase. This is accomplished by cross-linking the cardholder's phone number to the credit card number and providing the customer with a corresponding PIN that can be changed immediately upon receipt so that it is a number that the cardmember can easily remember. The PIN can also be selected by the cardmember from his or her home phone. As one method of authentication, the bank can verify the identity of the caller by their phone number using an Automatic Number Identification ("ANI") system which ensures a secure registration of the PIN. The customer can then self-select the PIN he or she wishes to use.

These and other objects and advantages of the invention will be apparent from the detailed description of the preferred embodiments which follows.

DETAILED DESCRIPTION OF THE PREFERRED EMBODIMENTS

Figure 1:
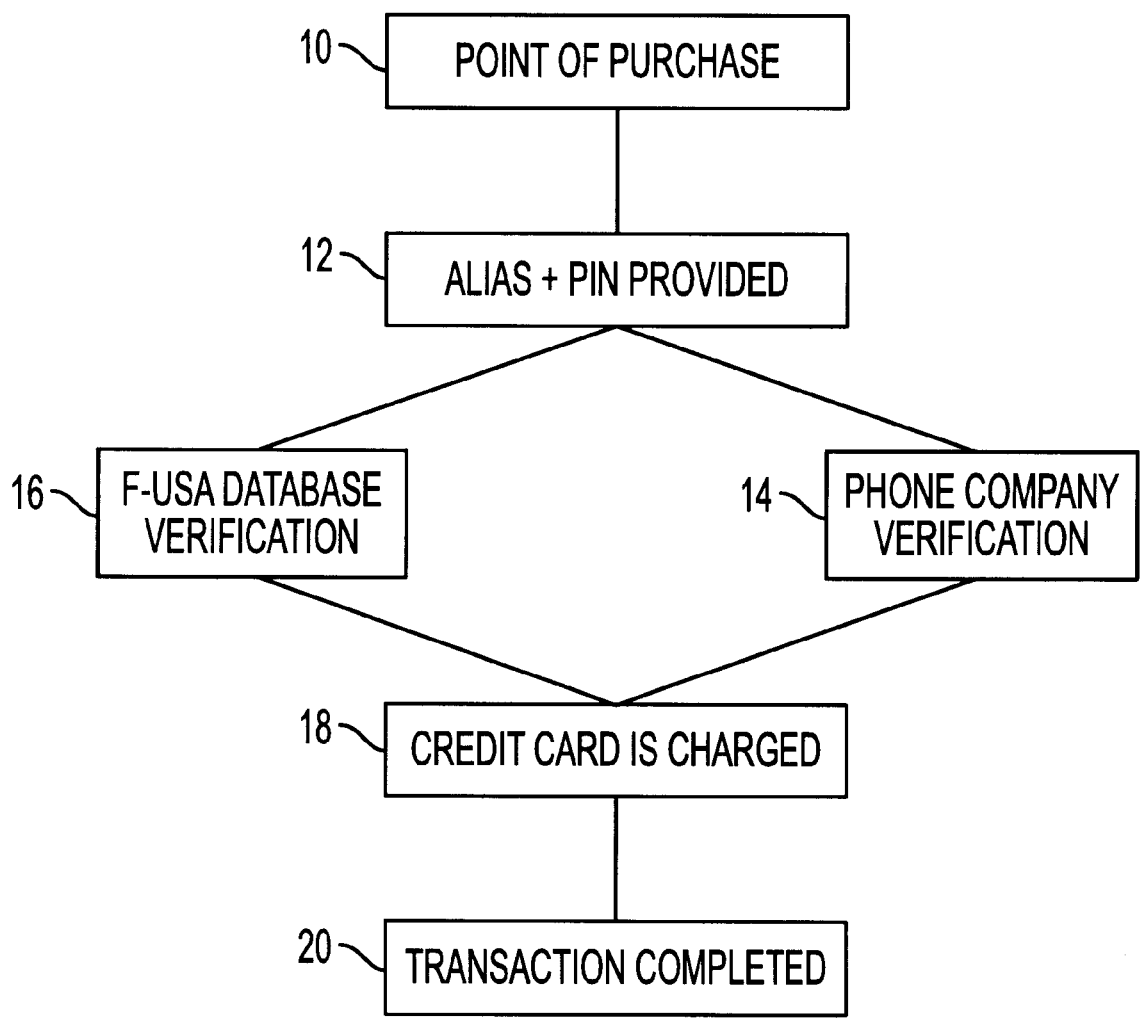
FIG. 1 shows a flow charts for a method of use according to one embodiment of the present invention according to one embodiment of the invention.

FIG. 1 shows one example of a cardholder transaction according to the present invention. In FIG. 1, a credit card purchase is commenced at any given point of purchase location, step 10. A point of purchase location is any location where it is possible to make a purchase using a credit card. For example, any store that accepts credit cards would be a point of purchase location. Any telephone can be considered a point of purchase location since it is possible to telephone a company, such as a catalog company, and place a credit card order over the phone. Instead of providing the merchant with the credit card for payment, or in the case of a telephone order providing the card number and expiration date, the cardmember will enter the cardmember's ten-digit home telephone number and PIN into a device similar to the credit card readers in use today, step 12.

This device will connect to a database, perhaps the database already maintained by the telephone company, step 14, and it will check for authenticity. Alternatively, the credit card company may have their own database which includes all the appropriate information and can verify the cardholder and process the transaction with the appropriate card, step 16.

The validation process should be fairly quick and will then retrieve the credit card linked to the phone number and PIN the cardmember has provided. After validation has succeeded, the credit card will be charged and the merchant will receive notice of this validation, step 18. The cardmember must then sign some sort of receipt or authorization slip and the transaction is complete, step 20.

This entire process is very similar to current day credit card transactions with the exception that instead of providing a plastic card, the cardmember need only enter their ten-digit phone number and PIN. The above embodiment requires a special "keypad" for use by customers so they can enter their phone number and PIN discreetly. Alternatively, the customer can provide the ten-digit number and PIN directly to the merchant.

Figures 2A, 2B:
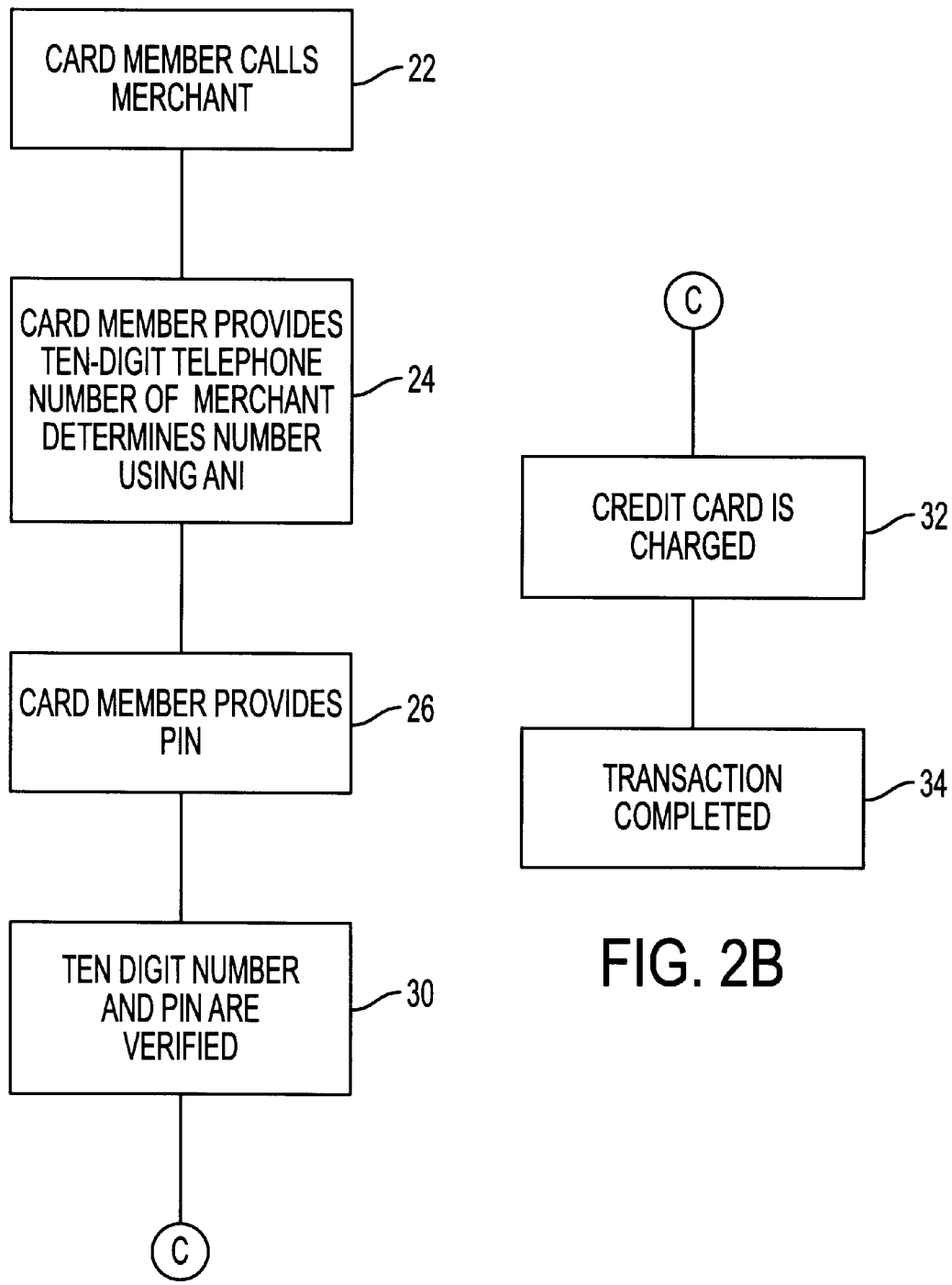
FIGS. 2A and 2B show a flow chart of one embodiment of the present invention.

FIGS. 2A and 2B show a similar transaction between a cardmember and a merchant conducted over a telephone. In FIG. 2A, a cardmember initiates a transaction by calling a merchant over the telephone in step 22. After identifying the item to be purchased, the cardmember authorizes his card to be charged by providing the representative with his ten-digit telephone number. Alternatively, the merchant may use an ANI to determine the telephone number of the caller, step 24. This is useful in situations where the cardmember is calling from their home and provides an added measure of security to make sure the authorized cardmember is the one placing the order.

The transaction is continued and the card number received by the merchant is verified using the cardmember's PIN. In step 26, the cardmember provides the PIN to the merchant This can be done by having the cardmember punch in the PIN on the telephone key pad or verbally indicating the PIN to the merchant. The ten-digit number and PIN are verified by the merchant in step 30. The verification process is similar to that used to verified original credit card numbers and expiration dates. Once the number has been verified, the merchant processes the transaction and the credit card is charged in step 32. After the credit card has been charged, the transaction is completed, step 34.

Figure 3A:
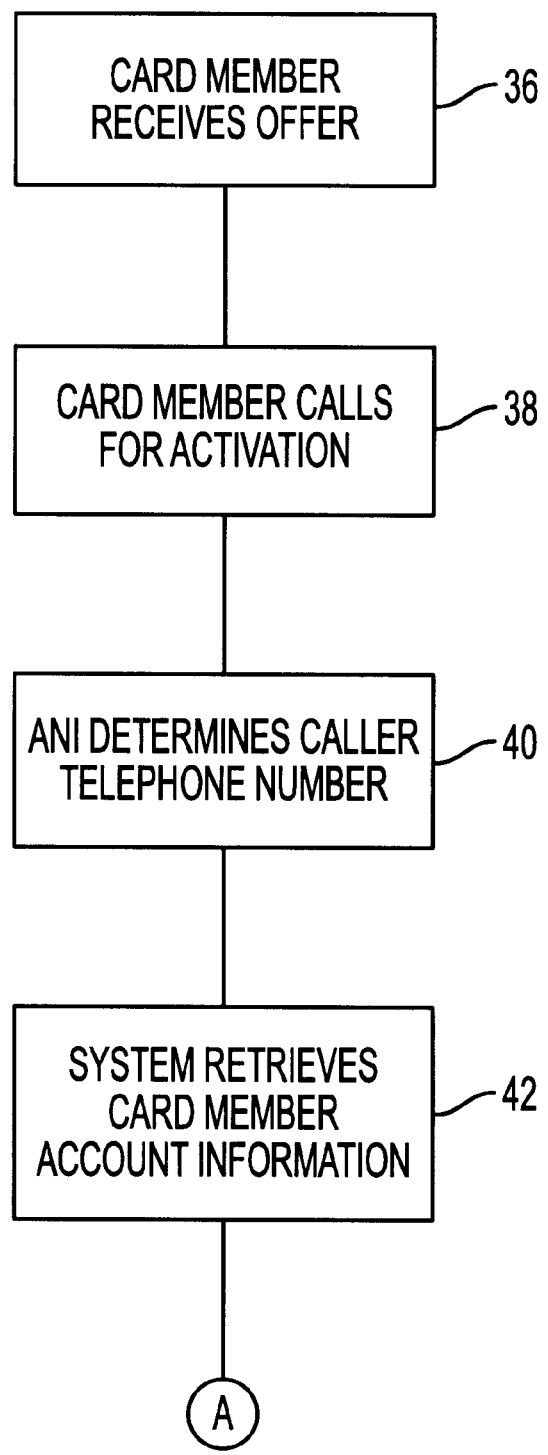
FIGS. 3A and 3B show a flow charts for the selection of a PIN according to one embodiment of the present invention.
Figure 3B:
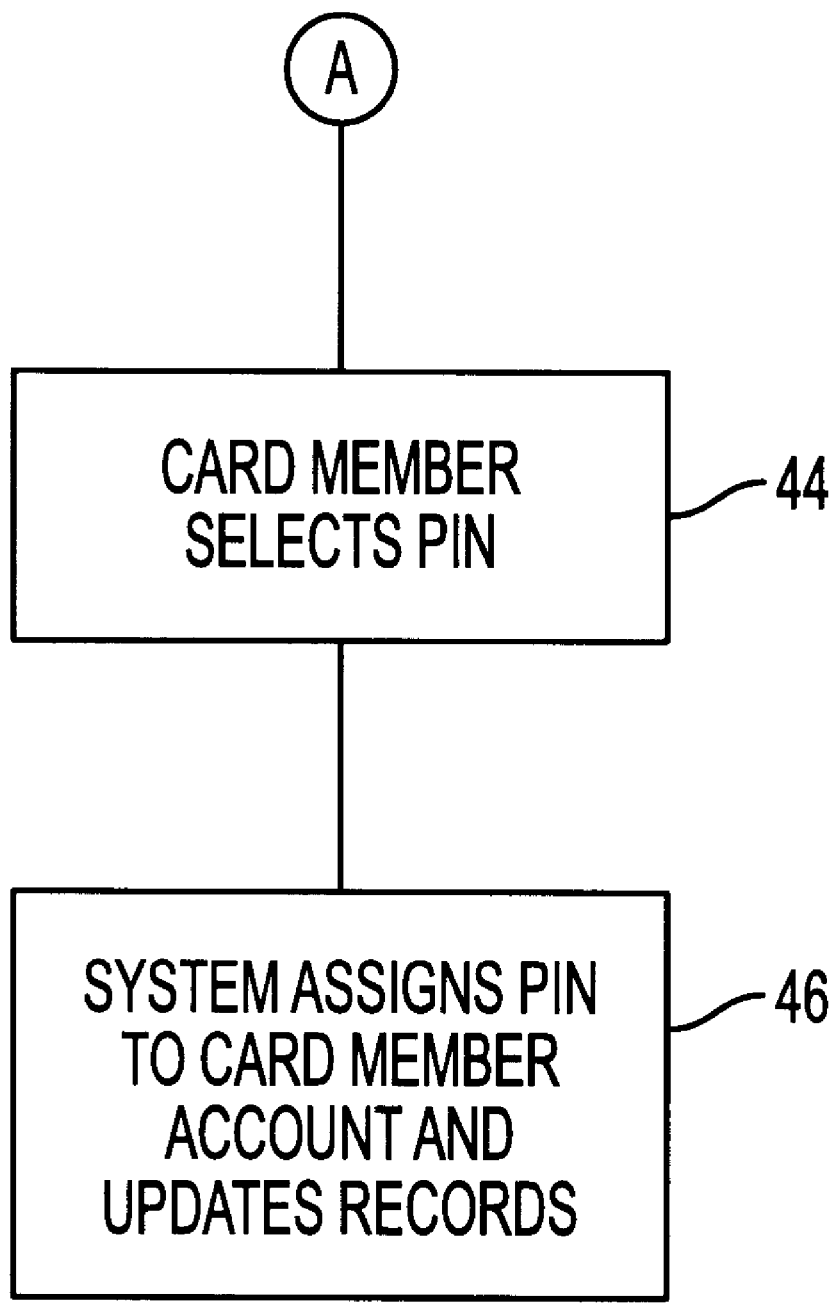

Assigning an alias and selecting a PIN are relatively easy processes. FIGS. 3A and 3B show the activation and assignment process for a current cardmember. A current cardmember is a person that already has a credit card account with the credit card company and is merely calling to activate their alias and select a PIN. The activation process is initiated in step 26 when a current card member receives the offer from the credit card company to activate the alias. This offer can be received by mail, e-mail, telephone, or any number of ways. If the offer was received by any means other than a telephone call, the cardmember must call the credit card company for activation, step 38. When the call is received by the credit card company, the caller's telephone number is automatically identified by an ANI system, step 40.

By determining the telephone number of the caller, the credit card company can determine the caller's identity and account number. This can be done by asking the caller for his account number or, preferably, by having the system automatically retrieve the cardmember's account information based on the telephone number as shown in step 42. In step 44, the cardmember selects a PIN to be used with his telephone number alias. Alternatively, the credit card company can assign a PIN randomly. The activation process is completed in step 46 when a credit card company mainly assigns a PIN to the card member's account and updates a record or the system performs this functions automatically.

The activation process can be totally automated as well. For example, a current cardmember would receive the offer in the mail including a telephone number the cardmember to call for activation. The cardmember would then call the designated number. The credit card company could then automatically determine the cardmember's telephone number using an ANI and present the cardmember with a pre-recorded menu of options. By using these options the cardmember would be able to request activation of the alias and select a PIN number using the telephone key pad. Registration is then completed by having the system automatically update the cardmember's account and records with the alias and the selected PIN.

Figure 4A:
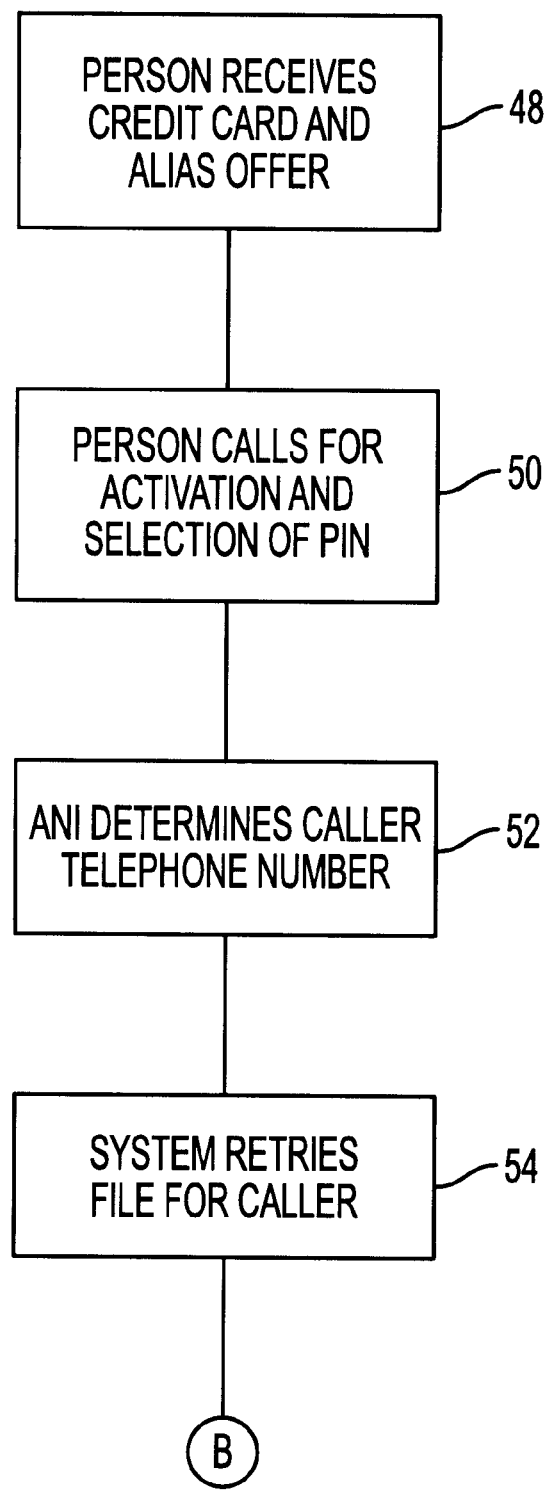
FIGS. 4A and 4B show a flow chart for the selection of a PIN according to one embodiment of the present invention. Embodiments of the invention may include some or all of the various components as described below.
Figure 4B:
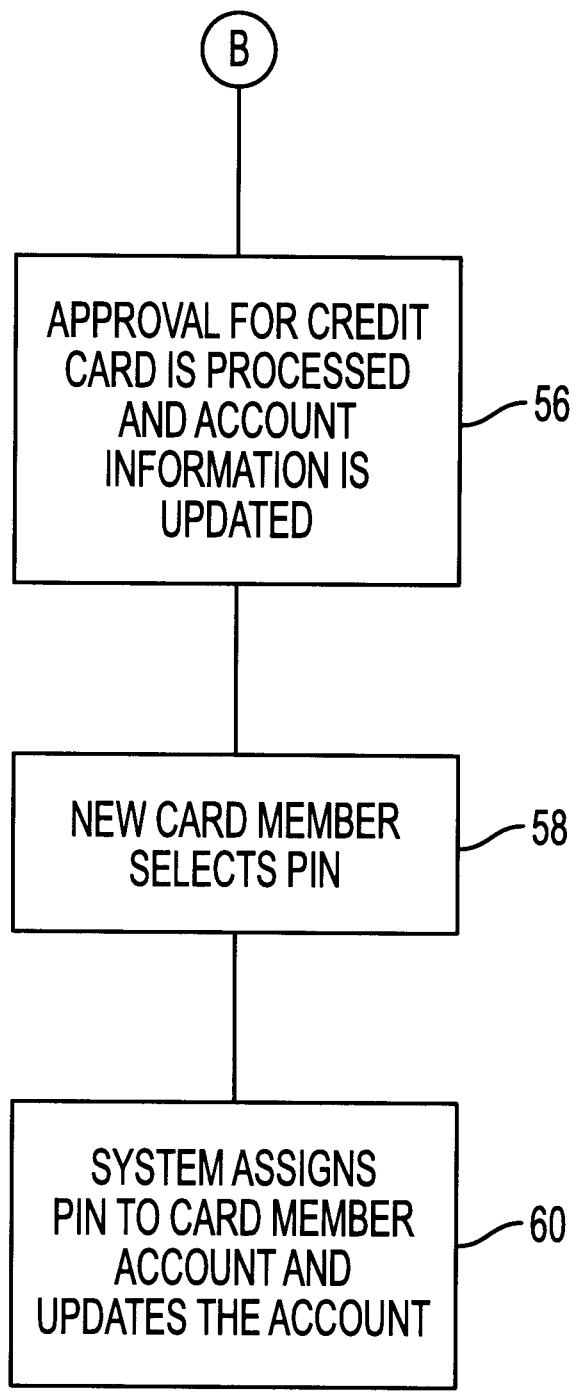

The activation and registration process can also be utilized by a new cardmember. As shown in FIGS. 4A and 4B, a new member would receive a credit card offer with an option to assign an alias to the new account, step 48. The person can accept this offer and apply for the credit card and alias by calling a designated number for activation, step 50. In step 52, the credit card company can use an ANI to determine the caller's telephone number. Alternatively, a customer service representative can verbally obtain the information from the card member. In step 54, the system would receive a file containing the caller's financial information and pre-approval status. This information can be used by a customer service representative or by the system automatically to activate a new account for the caller. Preferably, a customer service representative would obtain additional financial information and confirm existing information thus providing the credit card company with a more thorough screening process.

Approval for the new account can then be processed in step 56 and any updating can also be performed as well. At this time, the cardmember can also select a PIN as shown in step 58. Alternatively, a PIN can be randomly assigned by the credit card company to the new account. Registration and activation process is completed in step 60 when the system assigns the PIN to the cardmember's account and updates the account accordingly. At this point, the system can activate the account or hold it pending approval of subsequent credit checks.

Consumers who have a plurality of credit cards have the option of selecting multiple PINs, each of which would correspond to a different credit card. When making a purchase, the cardholder need only provide the PIN corresponding to the card he or she wishes to charge the purchase on.

Security measures for the Cardless Payment System will be nearly the same as those used by credit cards. Credit cards themselves are not a secure system by definition. If a card is lost or stolen, misuse of the credit card is quite possible. The same systems used to handle fraud for credit cards will be used to handle the present invention. No new security issues exist with the Cardless Payment System beyond the current ones faced by credit cards today. In fact, perhaps even less security issues exist with the Cardless Payment System due to the fact that no credit card is being carried around by the cardmember and thus the chances of having the credit card lost or stolen is significantly reduced. If the cardmember decides to destroy the plastic card and rely solely on the Cardless Payment System then the chances of the card being lost or stolen are practically zero.

The registration process for the Cardless Payment System is also unique. Using home phone numbers as the credit card alias, a database will be used to store the matching information so as to determine which phone numbers go with which credit cards. The process involves keeping this data is a database such as the telephone company's current database. Telephone companies already have databases with consumer's phone numbers stored. Linking the telephone number within the database to a credit card number would allow for a seamless integration of the two.

Additionally, once consumers have entered this number they can select multiple payment methods. For example, if a cardmember bas two different credit cards and a debit card, after entering their ten-digit phone number and PIN they can choose which card to use for payment through some sort of self-selection menu. Alternatively, a single cardmember may have multiple PINs representing different credit cards. It would be possible to assign one PIN to their Visa card and another PIN to their Mastercard, both on the same phone number.

Uses include point of sale wherever there is a terminal where consumers can enter in a number. The invention is also applicable to card not present situations ordering a product by telephone, etc. This would allow the consumer to buy something without giving their credit card information over the phone. All they need to do is not in the PIN since the phone number is automatically detected over the phone by the merchant. This is added security since many people still do not like disclosing credit card numbers over the phone.

Other embodiments and uses of the invention will be apparent to those skilled in the art from consideration of the specification and practice of the invention disclosed herein. The specification and examples should be considered exemplary only. The intended scope of the invention is only limited by the claims appended hereto.

What is claimed is:

1. A method for completing a credit card transaction in which a user is not required to know a credit card number and is not required to have a credit card physically present during the credit card transaction, the method comprising the steps of:

assigning an alias to a pre-existing credit card number, the credit card number also having an associated PIN;

linking the alias with the credit card number and the PIN in a database;

providing a credit card owner with the alias;

receiving the alias and the PIN upon initiation of a transaction without receipt of the credit card number;

retrieving the credit card number from the database based on the alias;

authenticating the transaction by retrieving the PIN in the database and comparing the retrieved PIN with the received PIN; and performing the transaction if authentication is successful.

2. The method of claim 1, wherein said alias is a telephone number.

3. The method of claim 1, wherein performing the transaction comprises informing a merchant of the authentication and charging the credit card.

4. The method of claim 1, wherein assigning an alias comprises assigning a home telephone number of a card holder.

5. The method of claim 1, wherein the step of receiving the alias comprises receiving the alias through the use of a device connected to the database.

6. The method of claim 1, wherein the step of retrieving the credit card number comprises retrieving the credit card number from a database maintained by the credit card company.

7. The method of claim 1, wherein the step of retrieving the credit card number comprises retrieving the credit card number from a database maintained by the telephone company.

8. The method of claim 1, wherein receiving the alias and PIN comprises receiving the alias and PIN through the use of a key pad.

9. The method of claim 1, wherein receiving the alias and PIN comprises receiving the alias and PIN through the use of a telephone.

10. A method for completing a credit card transaction in which a cardholder is not required to know a credit card number and is not required to have a credit card physically present during the credit card transaction, the method comprising the steps of:

linking an alias, which includes telephone number of the cardholder with a credit card number and a PIN in a database;

initiating a transaction when the cardholder attempts to make a purchase and enters the telephone number;

searching the database for a PIN and a credit card number linked to the telephone number;

prompting the cardholder for entry of a PIN;

authenticating the transaction if the PIN entered by the cardholder matches the PIN found through the database search; and performing the transaction by charging the credit card number found during the database search if the transaction is authenticated.

* * * * *